United States Patent
Yang et al.

(10) Patent No.: US 9,319,083 B2
(45) Date of Patent: Apr. 19, 2016

(54) APPARATUS AND METHOD FOR RECEPTION USING ITERATIVE DETECTION AND DECODING

(71) Applicant: Samsung Electronics Co., Ltd., Gyeonggi-do (KR)

(72) Inventors: Joo-Yeol Yang, Gyeonggi-do (KR); Min-Goo Kim, Gyeonggi-do (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/713,759

(22) Filed: May 15, 2015

(65) Prior Publication Data

US 2016/0072535 A1    Mar. 10, 2016

(30) Foreign Application Priority Data

Sep. 5, 2014  (KR) ........................ 10-2014-0118840

(51) Int. Cl.
*H04L 27/06*  (2006.01)
*H03K 9/00*  (2006.01)
*H04B 1/16*  (2006.01)
*H04B 7/04*  (2006.01)
*H04L 5/00*  (2006.01)

(52) U.S. Cl.
CPC ................ *H04B 1/16* (2013.01); *H04B 7/0413* (2013.01); *H04L 5/0048* (2013.01)

(58) Field of Classification Search
USPC ............ 375/219, 220, 221, 222, 240, 240.03, 375/240.205, 240.07, 240.04, 240.06, 375/240.12, 240.18, 240.24, 240.26, 375/240.23, 240.22, 240.27, 259, 265, 262, 375/263, 264, 278, 284, 285, 295, 316, 324, 375/325, 340, 341, 342, 346, 359
See application file for complete search history.

(56) References Cited

U.S. PATENT DOCUMENTS

| | | | |
|---|---|---|---|
| 2006/0005104 A1* | 1/2006 | Harada | H03M 13/1105 714/758 |
| 2007/0297496 A1 | 12/2007 | Park et al. | |
| 2011/0007729 A1* | 1/2011 | Nogami | H04J 11/004 370/342 |
| 2012/0014480 A1* | 1/2012 | Gotman | H03M 13/3746 375/340 |
| 2013/0156136 A1 | 6/2013 | Lee et al. | |
| 2013/0170842 A1* | 7/2013 | Koike-Akino | H04L 25/03171 398/208 |
| 2015/0244499 A1* | 8/2015 | Alexander | H01Q 23/00 375/341 |
| 2015/0295625 A1* | 10/2015 | Murakami | H04B 7/04 375/302 |

* cited by examiner

*Primary Examiner* — Linda Wong
(74) *Attorney, Agent, or Firm* — The Farrell Law Firm, P.C.

(57) ABSTRACT

A method of iterative detection and decoding by a receiver and a receiver for iterative detection and decoding. The method includes generating a channel estimated value using a received signal; storing the generated channel estimated value; generating a Log Likelihood Ratio (LLR) value using the received signal and the stored channel estimated value; and generating a decoded bit as feedback information using the LLR value, wherein the LLR value is iteratively regenerated using the generated feedback information, the stored channel estimated value, and the received signal.

12 Claims, 4 Drawing Sheets

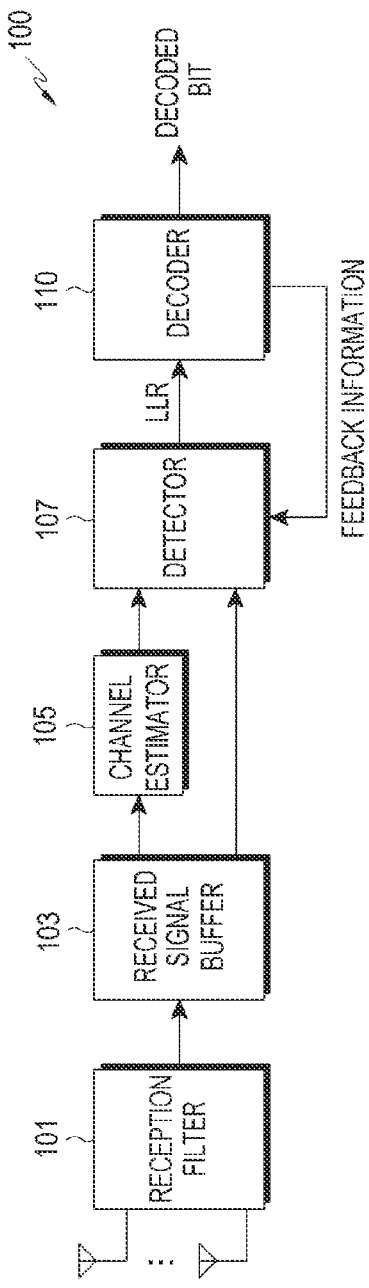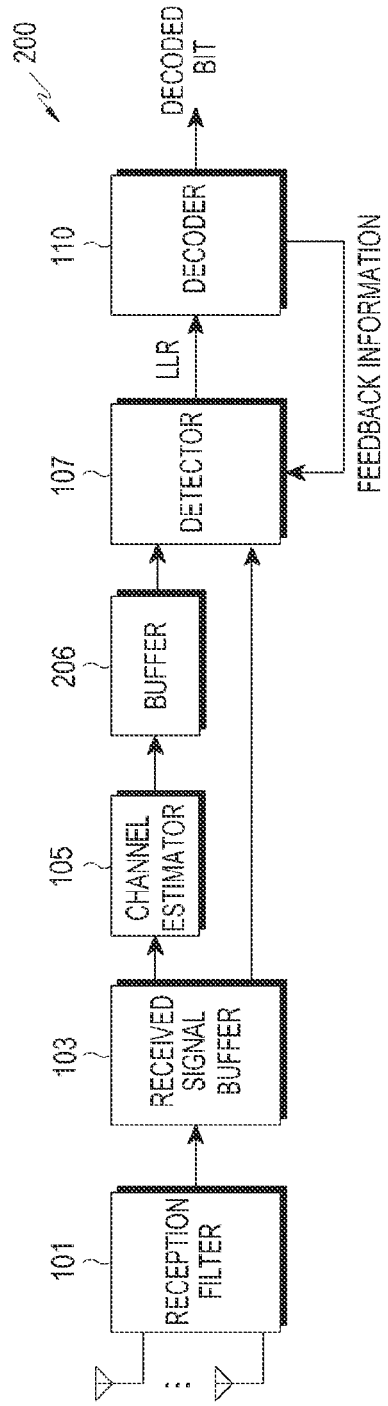
FIG.1 (PRIOR ART)
FIG.2

APPARATUS AND METHOD FOR RECEPTION USING ITERATIVE DETECTION AND DECODING

PRIORITY

This application claims priority under 35 U.S.C. §119(a) to a Korean Patent Application filed on Sep. 5, 2014 in the Korean Intellectual Property Office and assigned Serial No. 10-2014-0118840, the entire contents of which are incorporated herein by reference.

BACKGROUND

1. Field of the Disclosure

The present disclosure relates generally to a method and an apparatus for receiving a signal in a wireless communication system, and more particularly, to a method and an apparatus for receiving a signal by using iterative detection and decoding in a wireless communication system.

2. Description of the Related Art

Due to the recent rapid growth of the wireless mobile market, various multimedia services in a wireless environment are required. Particularly, improvements in large capacity data transmission and high speed data transmission are being progressed. Accordingly, a scheme capable of efficiently using limited frequencies uses, for example, a Multiple Input Multiple Output (MIMO) system using multiple antennas.

The MIMO technology refers to a system in which each of the transmitting and receiving sides uses multiple antennas, which may increase channel transmission capacity in proportion to the number of antennas without additional allocation of frequencies or transmission power in comparison with a system using a single antenna.

The multiple antenna technologies are divided into a spatial diversity scheme that acquires diversity corresponding to the product of the number of transmission/reception antennas to improve transmission reliability, a Spatial Multiplexing (SM) scheme that simultaneously transmits a plurality of signal columns to improve a transmission rate, and a scheme generated by combining the spatial diversity and the spatial multiplexing.

When the SM scheme is used, if respective transmitters transmit different data columns from each other, interference is generated between simultaneously transmitted data. Accordingly, the receiver detects a signal by using Maximum Likelihood (ML) considering an influence signal effect or performs detection after removing the interference. For a reference, the reference may be removed by zero forcing, Minimum Mean Square Error (MMSE) or the like.

However, since the reception schemes do not use a priori information on transmission bits, the reception performance may be improved. In order to improve the reception performance, an Iterative Detection and Decoding (IDD) scheme may be applied.

To facilitate understanding, the IDD scheme is briefly described below.

In the IDD scheme, a turbo principle is applied to a MIMO receiver, and a receiver of the iterative detection and decoding scheme has a configuration in which a detector and a decoder are concatenated. The detector generates soft decision information of a received signal and transmits the generated soft decision information to the decoder. The soft decision information may be generated by a Log Likelihood Ratio (LLR).

Then, the decoder generates a new soft decision value by decoding each bit of the received signal using the soft decision information provided from the detector. Thereafter, the new soft decision value generated by the decoder is fed back to the detector and used as a priori information for iterative detection and decoding. The process is repeated a predetermined number of times to increase the reliability of the received signal.

SUMMARY

The present disclosure has been made to address the above-mentioned problems and disadvantages, and to provide at least the advantages described below. Accordingly, an aspect of the present disclosure provides a method and an apparatus for reducing power consumption in a reception system using an iterative detection and decoding scheme.

In accordance with an aspect of the present disclosure, a method of iterative detection and decoding by a receiver is provided. The method includes generating a channel estimated value using a received signal; storing the generated channel estimated value; generating a Log Likelihood Ratio (LLR) value using the received signal and the stored channel estimated value; and generating a decoded bit as feedback information using the LLR value, wherein the LLR value is iteratively regenerated using the generated feedback information, the stored channel estimated value, and the received signal.

In accordance with another aspect of the present disclosure, a receiver for iterative detection and decoding is provided. The receiver includes a channel estimator configured to generate a channel estimated value using a received signal; a first buffer configured to store the generated channel estimated value; a detector configured to generate an LLR value using the received signal and the stored channel estimated value; and a decoder configured to generate feedback information including a decoded bit using the LLR value, wherein the LLR value is iteratively regenerated using the generated feedback information, the stored channel estimated value, and the received signal.

In accordance with another aspect of the present disclosure, a method of iterative detection and decoding by a receiver is provided. The method includes generating a channel estimated value using a received signal; generating a first LLR value which is not influenced by feedback information using the received signal and the channel estimated value; storing the generated first LLR value; generating a second LLR value which is influenced by the feedback information using the received signal, the channel estimated value, and the feedback information; generating a total LLR value by adding the second LLR value to the stored first LLR value; and generating the feedback information including decoded bit information using the total LLR value, wherein the second LLR value is iteratively regenerated using the received signal, the generated feedback information, and the channel estimated value.

In accordance with another aspect of the present disclosure, a receiver for iterative detection and decoding is provided. The receiver includes a channel estimator configured to generate a channel estimated value using a received signal; a first detector configured to generate a first LLR value which is not influenced by feedback information using the received signal and the channel estimated value; a first buffer configured to store the generated first LLR value; a second detector configured to generate a second LLR value which is influenced the feedback information by using the received signal, the channel estimated value, and the feedback information and add the second LLR value to the stored first LLR value to generate a total LLR value; and a decoder configured to generate the feedback information including decoded bit information using the total LLR value, wherein the second LLR value is iteratively regenerated using the received signal, the generated feedback information, and the channel estimated value.

BRIEF DESCRIPTION OF THE DRAWINGS

The above and other aspects, features, and advantages of the present disclosure will be more apparent from the following detailed description, taken in conjunction with the accompanying drawings, in which:

FIG. 1 is a block diagram of a receiver using a general iterative detection and decoding scheme;

FIG. 2 is a block diagram of a receiver according to an embodiment of the present disclosure;

DETAILED DESCRIPTION

Figure 3:
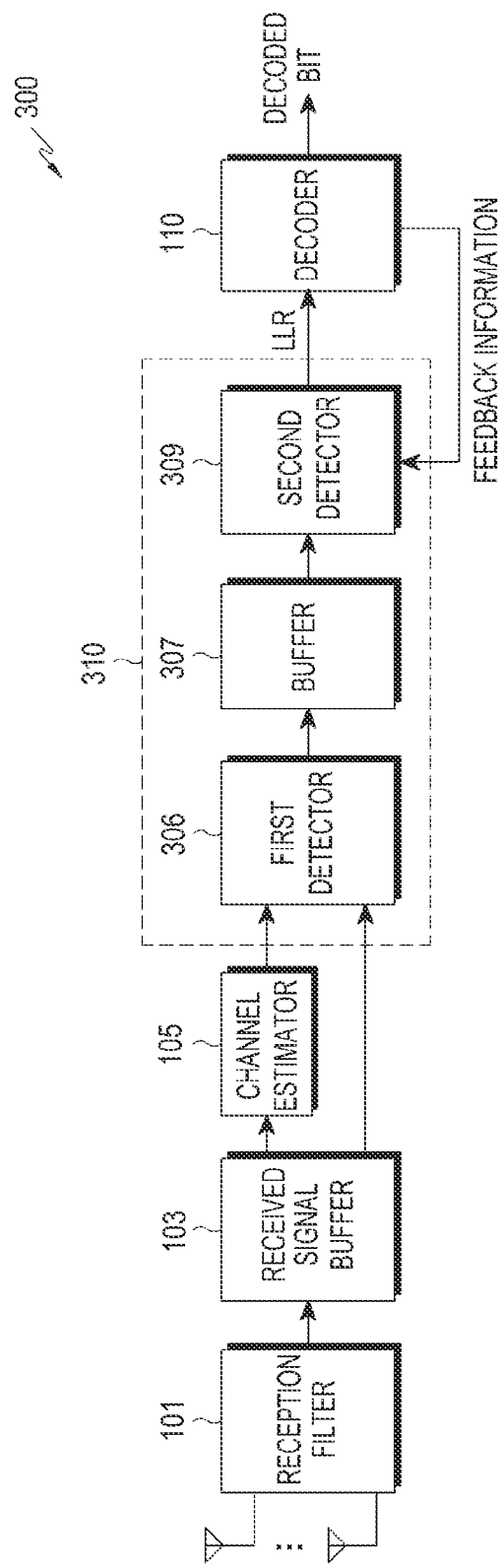
FIG. 3 is a block diagram of a receiver according to an embodiment of the present disclosure.

In the following description of the present disclosure, a detailed description of known configurations or functions incorporated herein are omitted when the detailed description may make the subject matter of the present disclosure unclear. Hereinafter, embodiments of the present disclosure are described with reference to the accompanying drawings.

Although embodiments of the present disclosure as described below are separated for the convenience of description, two or more embodiments may be combined so long as they do not conflict with each other.

While terms including ordinal numbers, such as "first" and "second," etc., may be used to describe various components, such components are not limited by the above terms. The terms are used merely for the purpose of distinguishing one element from another element. For example, without departing from the scope of the present disclosure, a first structural element may be named a second structural element. Similarly, the second structural element also may be named the first structural element. As used herein, the term "and/or" includes any and all combinations of one or more associated items.

The terms used herein are used only to describe embodiments of the present disclosure, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existence or probability of addition of one or more other features, numeral, steps, operations, structural elements, parts, or combinations thereof.

Hereinafter, various embodiments are described with reference to the accompanying drawings. It should be noted that the same elements are designated by the same reference numerals although they are shown in different drawings. Further, in the following description of the present disclosure, a detailed description of known functions and configurations incorporated herein is omitted when it may obfuscate the subject matter of the present disclosure. Hereinafter, it should be noted that only the descriptions will be provided that facilitate understanding the operations provided in association with the various embodiments of the present disclosure, and other descriptions are omitted to avoid obfuscating the subject matter of the present disclosure.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of the 3rd Generation Partnership Project 2 (3GPP2), a Wideband Code Division Multiple Access (WCDMA) mobile communication system of the 3GPP2, a Code Division Multiple Access (CDMA) mobile communication system of the 3GPP2, Institute of an Electrical and Electronics Engineer (IEEE) 802.16m communication system, an Evolved Packet System (EPS), a Mobile Internet Protocol (Mobile IP) system and the like.

FIG. 1 is a block diagram of a receiver 100 using an iterative detection and decoding method.

In FIG. 1, the receiver 100 includes a reception filter 101, a received signal buffer 103, a channel estimator 105, a detector 107, and a decoder 110.

The reception filter 101 filters a signal received via one or more antennas and the received signal buffer 103 stores the filtered received signal.

In general, a transmitter inserts a pilot signal or a reference signal into a transmitted signal in order to allow the receiver 100 to perform a channel estimation. The receiver 100 performs the channel estimation by using the pilot signal or the reference signal. The channel estimator 105 detects the pilot signal or the reference signal included in the received signal to perform the channel estimation and outputs a channel estimated value.

The detector 107 generates an LLR value by using the received signal stored in the received signal buffer 103 and the channel estimated value output from the channel estimator 105.

The decoder 110 performs a decoding by using the LLR value generated by the decoder 107 to generate a final decoded bit. Then, in order to reduce the probability of generating errors in the generated decoded bit, the decoder 110 feeds back the output of the decoder 110 to the detector 107.

The detector 107 regenerates the LLR value using the received signal, the channel estimated value, and the feedback information transmitted from the decoder 110. The decoder 110 performs another decoding using the LLR value regenerated by the detector 107. Operations of the detector 107 and the decoder 110 are iteratively performed until predetermined conditions are met, and then a decoded bit is generated.

When the number of iterative decodings reaches a preset maximum number of iterations during such an iterative decoding process, the iterative decoding process is ended. However, conditions under which the iterative decoding is ended may be variously set.

When the receiver 100 has Nr reception antennas, the transmitter has Nt transmission antennas, and the transmitter transmits/receives data according to a MIMO scheme in FIG. 1, the received signal of the receiver 100 in FIG. 1 is expressed based on Equation (1) below.

$$y = Hx + n \quad (1)$$

In Equation (1), the parameters have the following definitions:

y is a received signal vector (e.g. Nr×1 column vector);

H is a channel matrix (e.g. Nr×Nt matrix);

x is a transmitted symbol vector (e.g. Nt×1 column vector); and n is an additive noise vector (e.g. Nr×1 column vector).

In addition, an LLR value for each bit transmitted by the transmitter with respect to the received signal of Equation (1) is expressed by Equation (2) below.

$$L(b_{i,l}) = \log\frac{p(b_k=0|y)}{p(b_k=1|y)} = \log\frac{\sum_{x:b_{i,j}=0} p(y|x)p(x)}{\sum_{x:b_{i,j}=1} p(y|x)p(x)} \quad (2)$$

$$\log\frac{\sum_{x:b_{i,j}=0} p(y|x) \prod_{(m,n)\neq(i,l)} p(b_{m,n})}{\sum_{x:b_{i,j}=1} p(y|x) \prod_{(m,n)\neq(i,l)} p(b_{m,n})} + \log\frac{p(b_k=0)}{p(b_k=1)} \stackrel{def}{=}$$

$$L_E(b_{i,l}) + L_a(b_{i,l})$$

Equation (2) above expresses an ML detection scheme using a priori information.

Equation (2) above includes a first part $L_E(b_{i,l})$ and a second part $L_a(b_{i,l})$, where the second part $L_a(b_{i,l})$ indicates a priori information on a transmitted bit. However, when the receiver 100 performs a first detection operation, the a priori information does not exist yet. Accordingly, the receiver performs the first detection operation without a priori information.

After the first detection process, the decoder 110 performs a decoding, and transmits feedback information to the detector 107 since a decoding result value is used as the a priori information. After a second detection operation, the detector 107 performs a detection process by using the feedback information transmitted from the decoder 110 as the a priori information.

The receiver 100 of FIG. 1 also repeats a process of calculating a channel estimated value when performing an iterative detection operation in order to calculate an LLR value of Equation (2).

In Equation (2) above, the second part is a priori information and corresponds to a part used for updating the LLR value after the second iterative detection operation by the detector 107. In addition, an operation for calculating the remaining part, other than the second part, is the same as the value generated during an initial detection process. However, the receiver 100 of FIG. 1 repeats an operation for generating the first part to calculate the LLR value. However, since the first part is the same as the value generated during the initial detection process even in the iterative detection and decoding process, the repetition for generating the first part is not necessary.

Accordingly, the present disclosure provides a method and an apparatus for removing the unnecessarily repeated operation in the iterative detection and decoding process as described above.

Further, in the present disclosure, a buffer 206 described below is located at a proper position of the receiver 200 described below, so that an unnecessary operation is not repeated in the iterative detection decoding process. However, the "buffer" 206 suggested by the present disclosure refers to physical dedicated storage space or a concept including a software storage scheme.

Hereinafter, an embodiment of the present disclosure illustrated in FIG. 2 and an embodiment of the present disclosure illustrated in FIG. 3 are described below.

FIG. 2 is a block diagram of a receiver 200 according to an embodiment of the present disclosure.

A basic configuration of the receiver 200 of FIG. 2 is similar to that of the receiver 100 of FIG. 1. That is, the receiver 200 of FIG. 2 is the same as the receiver 100 of FIG. 1 in that the receiver 200 of FIG. 2 includes a reception filter 101, a received signal buffer 103, a channel estimator 105, a detector 107, and a decoder 110.

However, the receiver 200 of FIG. 2 additionally includes a buffer 206 after the channel estimator 105. The buffer 206 stores a channel estimated value output from the channel estimator 105 so that the channel estimator 105 does not need to perform a channel estimation operation when an iterative detection operation is performed.

FIG. 3 is a block diagram of a receiver 300 according to an embodiment of the present disclosure.

A basic configuration of the receiver 300 of FIG. 3 is similar to that of the receiver 100 of FIG. 1. That is, the receiver 300 of FIG. 3 is the same as the receiver 100 of FIG. 1 in that the receiver 300 of FIG. 3 includes a reception filter 101, a received signal buffer 103, a channel estimator 105, and a decoder 110.

However, the receiver 300 of FIG. 3 includes a detector 310 suggested by the embodiment of the present disclosure illustrated in FIG. 3, where the detector 310 includes a first detector 306, a buffer 307, and a second detector 309.

The first detector 306 calculates and outputs a part which is not influenced by feedback information of the detector 110, and the buffer 307 stores output values of the first detector 306. The second detector 309 calculates and outputs a part which is influenced by the feedback information of the decoder 110. That is, in the embodiment of the present disclosure illustrated in FIG. 3, the first detector 306 of the detector 310 generates the part which is not influenced by the feedback information of the decoder 110 and separately stores the generated part in the buffer 307, so that unnecessary operations are not iteratively performed when an iterative decoding is performed. In addition, the second detector 309 generates the part which is influenced by the feedback information and performs the iterative decoding.

An LLR value generated by the detector 310 of the receiver 300 of FIG. 3 is described with reference to Equation (2) above.

When a first part of Equation (2) is called a "first LLR value", the first LLR value is irrelevant to the feedback information transmitted from the decoder 110, so that a process of calculating the first LLR value is performed by the first detector 306. The first LLR value calculated by the first detector 306 is stored in the buffer 307.

In addition, when a second part of Equation (2) is called a "second LLR value", a process of adding the second LLR value to the first LLR value corresponds to a process of using the feedback information transmitted from the decoder 110. Accordingly, a process of calculating the second LLR value and adding the calculated second LLR value to the first LLR value is performed by the second detector 309. An output of the second detector 309 is called a "total LLR value".

As described above, in the embodiment of the present disclosure illustrated in FIG. 3, a first LLR value which is not influenced by the feedback information is calculated and separately stored in the buffer 307, and a second LLR value which is influenced by the feedback information is calculated and added to the first LLR value. As a result, a total LLR value is generated. Accordingly, when the total LLR value is calculated by the iterative detection and decoding, the first LLR value which is not influenced by the feedback information is not iteratively calculated.

The description of the embodiment of the present disclosure illustrated in FIG. 3 has been made based on a case where a detector 310 uses an ML scheme. However, the embodiment of the present disclosure is only an example, and the detector 310 may use another detection scheme other than the ML scheme. That is, the detector 310 which uses a scheme other than the ML scheme separates a part which is influenced by the feedback information and a part which is not influenced by the feedback information, and accordingly, the scheme according to the embodiment of the present disclosure illustrated in FIG. 3 is applied to the detector 310 which uses a scheme other than the ML scheme.

In embodiments of the present disclosure, illustrated in FIGS. 2 and 3, positions of the buffer 206, 307 are different. However, the position of the buffer 206, 307 may be determined considering a trade-off between amounts of data to be stored in the buffer 206, 307 and amounts of the increase in implementation complexity due to the iterative detection operation.

For example, when amounts of calculation by the first detector 306 are larger than amounts of data to be stored in the buffer 307 in the embodiment illustrated in FIG. 3, it may be more efficient to place the buffer 206 before the detector 107 and iteratively perform the same operation by the buffer 206 like in the embodiment of the present disclosure illustrated in FIG. 2. When the amounts of calculation by the first detector 306 are smaller than the amounts of data to be stored in the buffer 307 in the embodiment of the present disclosure illustrated in FIG. 3, it is more efficient to place the buffer 307 within the detector 310 like in the embodiment of the present disclosure illustrated in FIG. 3. As described above, the position of the buffer 206, 307 according to embodiments of the present disclosure can be changed according to an implementation type of the block such as the detector 310.

Figure 4:
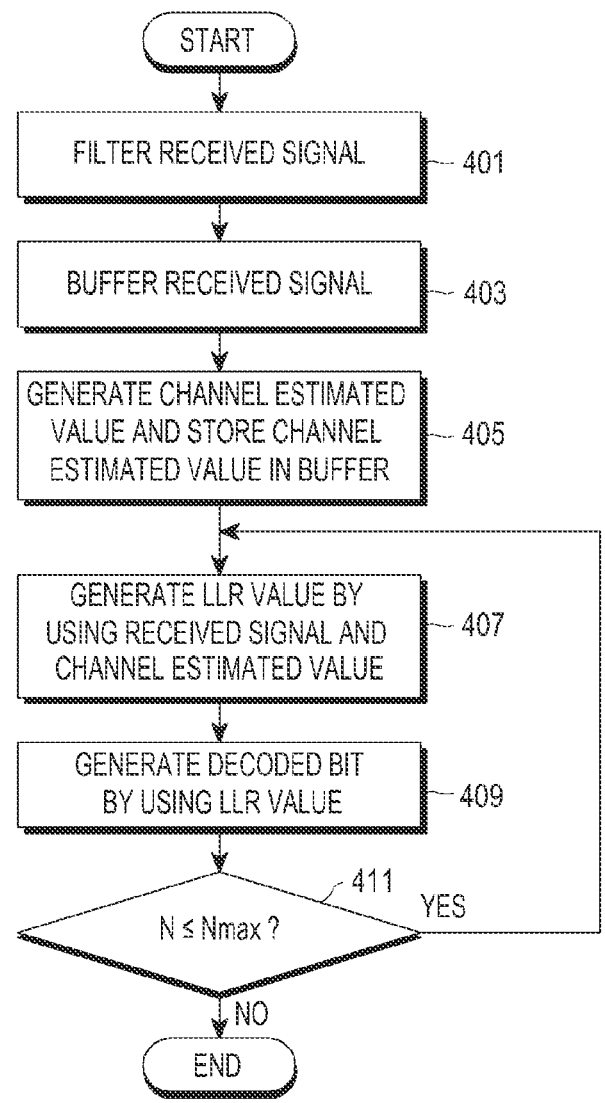
FIG. 4 is a flowchart of a reception method according to the embodiment of the present disclosure illustrated in FIG. 2.

FIG. 4 is a flowchart illustrating a reception method according to the embodiment of the present disclosure illustrated in FIG. 2.

A received signal is filtered in step 401, and the filtered received signal is stored in a buffer in step 403. In step 405, a channel estimated value is generated using a reference signal or a pilot signal included in the received signal, and the generated channel estimated value is stored in the buffer.

In step 407, an iterative detection operation is performed using the received signal and the channel estimated value and then an LLR value is generated. In step 409, a decoded bit is generated using the LLR value.

The number of iterative decodings N and the maximum number of iterative decodings Nmax are compared in step 411. When the number of iterative decodings is not larger than the maximum number of iterative decodings, the method returns to step 407 to perform another iterative detection and decoding. In the another iteration, since a channel estimated value uses a value stored in the buffer, it is not required to repeat the channel estimation in the another iterative detection operation. When the number of iterative decodings N is larger than the maximum of iterative decodings Nmax, the iterative detection and decoding process ends and a final decoded bit is the last decoded bit that was generated.

Figure 5:
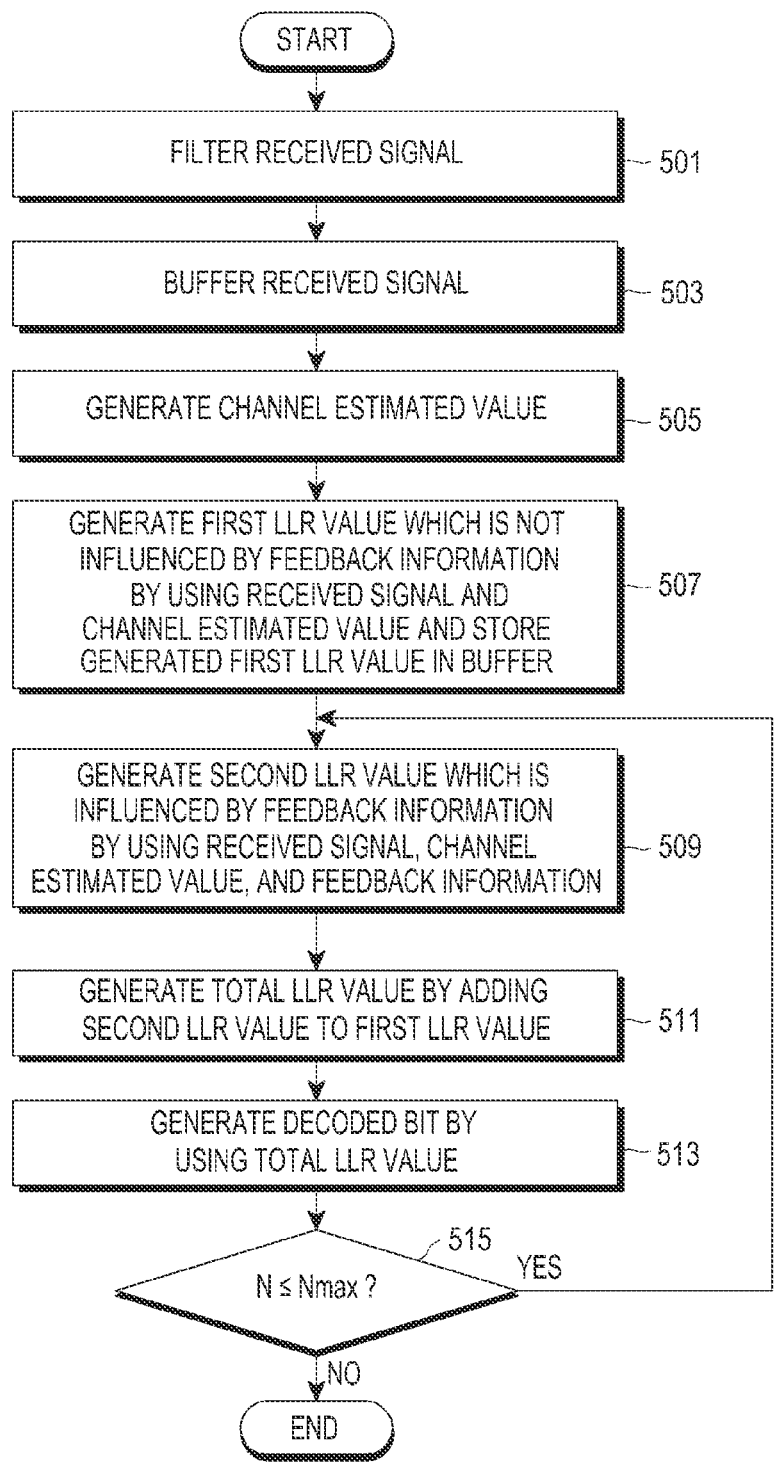
FIG. 5 is a flowchart of a reception method according to the embodiment of the present disclosure illustrated in FIG. 3.

FIG. 5 is a flowchart illustrating a reception method according to the embodiment of the present disclosure illustrated in FIG. 3.

A received signal is filtered in step 501, and the filtered received signal is stored in a buffer in step 503. In step 505, a channel estimated value is generated using a reference signal or a pilot signal included in the received signal.

In step 507, a first LLR value which is not influenced by feedback information is generated using the received signal and the channel estimated value, and the generated first LLR value is stored in the buffer. In step 509, a second LLR value which is influenced by the feedback information is generated using the received signal, the channel estimated value, and the feedback information. In step 511, a total LLR value is generated by adding the second LLR value to the first LLR value. In step 513, a decoded bit is generated using the total LLR value.

The number of iterative decodings N and the maximum number of iterative decodings Nmax are compared in step 515. When the number of iterative decodings is not larger than the maximum number of iterative decodings, the method returns to step 509 to generate another second LLR, and generate another total LLR value in step 511. In the another iteration, since the first LLR value uses a value stored in the buffer, it is not required to repeatedly generate the first LLR value. When the number of iterative decodings N is larger than the maximum of iterative decodings Nmax, the iterative detection and decoding process ends and a final decoded bit is the last decoded hit generated.

Some aspects of the present disclosure may also be implemented as a computer readable code in a computer readable recording medium. The computer readable recording medium is any type of data storage device capable of storing data readable by a computer system. Examples of the computer readable recording medium may include a Read-Only Memory (ROM), a Random Access Memory (RAM), a Compact Disc ROM (CD-ROM), a magnetic tape, a floppy disk, an optical data storage device, and a carrier wave (such as data transmission via the Internet). The computer readable recording medium may also be distributed over network-coupled computer systems so that the computer readable code is stored and executed in a distributed fashion. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Such an arbitrary software may be stored in, for example, irrespective of being erasable or rewritable, a volatile or non-volatile storage device such as a ROM, a memory such as a RAM, a memory chip device, or an integrated circuit, an optically or magnetically recordable and machine (e.g., a computer) readable storage medium such as a CD, a Digital Versatile Disc (DVD), a magnetic disk, or a magnetic tape. It can also be appreciated that the memory included in the mobile terminal is one example of non-transitory machine-readable devices suitable for storing a program including instructions that are executed by a processor device to thereby implement embodiments of the present disclosure.

Accordingly, the present disclosure includes a program including a code for implementing the apparatus and method described in the appended claims of the specification and a non-transitory machine (computer or the like)-readable storage medium for storing the program. Further, the program may be electronically transferred by a predetermined medium such as a communication signal transferred via a wired or wireless connection, and the present disclosure appropriately includes equivalents of the program.

Further, the apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although embodiments of the present disclosure have been described, the present disclosure may be modified in various forms without departing from the scope and spirit of the present disclosure. Therefore, the scope of the present disclosure should not be limited to the aforementioned embodiments of the present disclosure, but should be defined by the appended claims and their equivalents.

What is claimed is:

1. A method of iterative detection and decoding by a receiver, the method comprising:
    generating a channel estimated value using a received signal;
    generating a first Log Likelihood Ratio (LLR) value which is not influenced by feedback information using the received signal and the channel estimated value;
    storing the generated first LLR value;
    generating a second LLR value which is influenced by the feedback information using the received signal, the channel estimated value, and the feedback information;
    generating a total LLR value by adding the second LLR value to the stored first LLR value; and
    generating the feedback information including decoded bit information using the total LLR value,
    wherein the second LLR value is iteratively regenerated using the received signal, the generated feedback information, and the channel estimated value.

2. The method of claim 1, wherein generating the second LLR value and generating the total LLR value are performed in a predetermined maximum number of iterations.

3. The method of claim 1, further comprising receiving the received signal via at least one antenna.

4. The method of claim 1, further comprising filtering the received signal.

5. The method of claim 4, further comprising storing the filtered, received signal.

6. A receiver for iterative detection and decoding, the receiver comprising:
    a channel estimator configured to generate a channel estimated value using a received signal;
    a first detector configured to generate a first Log Likelihood Ratio (LLR) value which is not influenced by feedback information using the received signal and the channel estimated value;
    a first buffer configured to store the generated first LLR value;
    a second detector configured to generate a second LLR value which is influenced the feedback information by using the received signal, the channel estimated value, and the feedback information and add the second LLR value to the stored first LLR value to generate a total LLR value; and
    a decoder configured to generate the feedback information including decoded bit information using the total LLR value,
    wherein the second LLR value is iteratively regenerated using the received signal, the generated feedback information, and the channel estimated value.

7. The receiver of claim 6, wherein generating the second LLR value and generating of the total LLR value are performed in a predetermined maximum number of iterations.

8. The receiver of claim 6, further comprising at least one antenna configured to receive the received signal.

9. The receiver of claim 6, further comprising a reception filter configured to filter the received signal.

10. The receiver of claim 9, further comprising a second buffer configured to store the filtered, received signal.

11. A non-transitory computer-readable medium storing instructions which, when executed by one or more processors, have components of a receiver perform the following operations:
    generating a channel estimated value using a received signal;
    generating a first Log Likelihood Ratio (LLR) value which is not influenced by feedback information using the received signal and the channel estimated value;
    storing the generated first LLR value;
    generating a second LLR value which is influenced by the feedback information using the received signal, the channel estimated value, and the feedback information;
    generating a total LLR value by adding the second LLR value to the stored first LLR value; and
    generating the feedback information including decoded bit information using the total LLR value,
    wherein the second LLR value is iteratively regenerated using the received signal, the generated feedback information, and the channel estimated value.

12. An integrated circuit, comprising:
    a channel estimator capable of generating a channel estimated value using a received signal;
    a first detector capable of generating a first Log Likelihood Ratio (LLR) value which is not influenced by feedback information using the received signal and the channel estimated value;
    a first buffer capable of storing the generated first LLR value;
    a second detector capable of generating a second LLR value which is influenced by the feedback information by using the received signal, the channel estimated value, and the feedback information and adding the second LLR value to the stored first LLR value to generate a total LLR value; and
    a decoder capable of generating the feedback information including decoded bit information using the total LLR value,
    wherein the second LLR value is iteratively regenerated using the received signal, the generated feedback information, and the channel estimated value.

* * * * *